(12) United States Patent  
Manroa et al.

(10) Patent No.: US 9,241,239 B2  
(45) Date of Patent: Jan. 19, 2016

(54) ESTABLISHING NETWORK CONNECTIVITY BASED ON LOCATION

(75) Inventors: Arun Manroa, Herndon, VA (US); Ahmed Bencheikh, Fairfax Station, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 277 days.

(21) Appl. No.: 13/463,550

(22) Filed: May 3, 2012

(65) Prior Publication Data

US 2013/0295962 A1  Nov. 7, 2013

(51) Int. Cl.
*H04W 24/00* (2009.01)
*H04W 4/02* (2009.01)
*H04W 48/16* (2009.01)
*H04W 64/00* (2009.01)
*H04W 48/20* (2009.01)

(52) U.S. Cl.
CPC .............. *H04W 4/02* (2013.01); *H04W 48/16* (2013.01); *H04W 64/00* (2013.01); *H04W 48/20* (2013.01)

(58) Field of Classification Search
CPC ......... H04L 67/18; H04L 51/04; H04L 67/26; H04L 67/306; H04L 12/589; H04M 1/72572; H04M 2250/56; H04M 1/72569; H04M 2250/10; H04M 2250/12; H04M 2203/2072; H04M 2242/30; G06Q 30/0601; G06Q 30/026
USPC ................ 455/512, 513, 456.3, 404.2, 435.1, 455/435.2, 435.3, 456.1, 434
See application file for complete search history.

(56) References Cited

U.S. PATENT DOCUMENTS

| | | | |
|---|---|---|---|
| 2005/0169214 A1* | 8/2005 | Suomela | 370/331 |
| 2007/0064634 A1* | 3/2007 | Huotari et al. | 370/310 |
| 2010/0103844 A1* | 4/2010 | Kim | 370/254 |
| 2011/0105102 A1* | 5/2011 | Jutzi et al. | 455/419 |
| 2011/0143755 A1* | 6/2011 | Islam et al. | 455/434 |
| 2011/0201354 A1* | 8/2011 | Park et al. | 455/456.1 |
| 2011/0286437 A1* | 11/2011 | Austin et al. | 370/338 |
| 2011/0306324 A1* | 12/2011 | Jang et al. | 455/414.1 |
| 2012/0064912 A1* | 3/2012 | Oh | 455/456.1 |

* cited by examiner

*Primary Examiner* — Kwasi Karikari
(74) *Attorney, Agent, or Firm* — Chapin IP Law, LLC

(57) ABSTRACT

A mobile computer device obtains location information indicating a geographical location in which the mobile computer device resides. The mobile computer device produces a list based on the location information. The list specifies one or more WiFi networks present in a vicinity of the geographical location. The computer device then establishes a wireless connection between the computer device and a WiFi network as specified in the list. Thus, a geographical location of the computer device can be used as a basis to initiate connectivity to a respective network.

43 Claims, 12 Drawing Sheets

MAP INFO
120-1

ZONE #1 ......... LIST 1 (NETWORK A1, NETWORK B2, NETWORK C5, NETWORK D2)

ZONE #2 ......... LIST 2 (NETWORK A3, NETWORK X2, NETWORK K4, NETWORK M)

ZONE #3 ......... LIST 3 (NETWORK A6, NETWORK B5)

ZONE #4 ......... LIST 4 (NETWORK B7, NETWORK D3, NETWORK X5)

MAP INFO
120-2

REGION #1 ......... AP 1
REGION #2 ......... AP 2
REGION #3 ......... AP 3
REGION #4 ......... AP 4
...

FIG. 6

ESTABLISHING NETWORK CONNECTIVITY BASED ON LOCATION

BACKGROUND

Conventional computer devices typically have the ability to identify a presence of WiFi access points. For example, according to current technology, to learn of WiFi access points in a region, a computer device transmits a wireless query signal in a region. In response to the wireless signal, any of one or more WiFi network access points in the region respond with information indicating their identities. Accordingly, via the response information from the access points, the operator of the computer can identify which, if any, WiFi networks are available in a region.

After identifying available WiFi networks, the computer device can initiate display of the identities of the different WiFi networks on a display screen. In such an instance, the user of the computer can manually select from a listing of the available WiFi networks in which to connect.

In accordance with another conventional application, the computer can be configured to monitor a region and automatically connect to a particular WiFi network depending on detected wireless signal strength. For example, a computer may be configured to automatically connect to one of multiple WiFi networks in a region depending on detected wireless signal strengths.

As a more specific example, to determine which of the multiple WiFi networks to connect, the computer device monitors a wireless signal strength of each of the WiFi networks. Based on signal strength information, the computer device connects to the WiFi network from which the strongest signal is received. Presumably, the WiFi network providing the greatest signal strength will provide the best conveyance of data to and from the computer device over the wireless network.

BRIEF DESCRIPTION OF EMBODIMENTS

Conventional applications suffer from a number of deficiencies. For example, even though a particular WiFi network provides a strongest signal strength in a region, the user of the computer may desire to connect to an alternative WiFi network available in the region. In such an instance, if the computer automatically connected to the strongest WiFi network, the user of the computer must manually select an alternative WiFi network in which to connect.

Additionally, a user of the computer may roam in a region in which multiple WiFi networks provide overlapping coverage. According to conventional applications, when moving about a region of wireless coverage, a user would have to manually select an appropriate WiFi network in the overlapping region.

Embodiments herein deviate with respect to conventional techniques. For example, one embodiment herein is directed to providing notification of the presence of one or more WiFi networks in a region based on a current location of the computer device. Establishing a connection between the computer device and a WiFi network can depend on a current location of the computer device in a geographical region.

More specifically, according to one embodiment, a mobile computer device obtains location information indicating a geographical location in which the mobile computer device currently resides. The mobile computer device utilizes the location information to produce a list. The list specifies one or more WiFi networks present in a vicinity of the geographical location. The computer device then establishes a wireless connection between the computer device and a WiFi network as specified in the list. Thus, a geographical location of the computer device can be used as a basis to initiate connectivity to a respective network.

In accordance with another embodiment, a computer device can be configured to receive location information indicating a current geographical location of the computer device. The computer device utilizes the location information to produce a list specifying one or more WiFi access points present in a vicinity of the current geographical location of the computer device. Thus, via the list, the computer device has general knowledge of the WiFi networks that are supposed to be present in the current geographical location. In accordance with further embodiments, the computer device monitors wireless signals transmitted in the current geographical location to identify a presence of one or more active WiFi access point communicating in the current geographical location. The computer device compares identities of the one or more active WiFi access points to WiFi access points in the list of WiFi network resources that are supposed to be present in or near the geographical location.

Via the comparison, the computer device can: i) determine which of one or more WiFi networks should be available in a region, but appear to be inactive; ii) determine new WiFi network resources that have yet to be discovered or registered as being available in a particular geographical region; iii) troubleshoot problem WiFi networks based on knowing which WiFi networks should be actively transmitting in a particular region, and so on.

These and other more specific embodiments are disclosed in more detail below.

Any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate distribution of content according to one or more different levels of quality from a server. The instructions, when executed by a processor of a respective computer device, cause the processor or multiple processors of the system to: obtain location information, the location information indicating a geographical location in which a computer device resides; utilize the location information associated with the computer device to produce a list specifying at least one WiFi network present in a vicinity of the geographical location; and establish a wireless connection between the computer device and a WiFi network as specified in the list.

Yet another embodiments herein includes a computer readable storage medium and/or system having instructions stored thereon to distribute content from an intermediate distribution node. The instructions, when executed by a processor of a respective computer device, cause the processor or multiple processors of the system to: receive location information indicating a current geographical location of a computer device; utilize the location information to produce a list associated with the current geographical location of the computer device, the list specifying at least one WiFi access point present in a vicinity of the current geographical location of the computer device; monitor wireless signals transmitted in the current geographical location to identify a presence of at least one active WiFi access point communicating in the current geographical location; and compare identities of the at least one active WiFi access point to the at least one WiFi access point in the list.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for use in the field of distributing different levels of quality of adaptive bit rate encoded content in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FIG. 4 is an example diagram illustrating an example of map information according to embodiments herein.

FIG. 6 is an example diagram illustrating an example of map information according to embodiments herein.

DETAILED DESCRIPTION

According to one embodiment, a mobile computer device receives location information indicating a geographical location in which the mobile computer device resides. The mobile computer device produces a list of network resources based on the location information. By way of a non-limiting example, the list can specify one or more WiFi networks that are registered to be present in a vicinity of the geographical location. The computer device establishes a wireless connection between the computer device and a WiFi network as specified in the list. Thus, a geographical location of the computer device can be used to identify which of one or more WiFi networks are potentially available for use by the computer device.

Figure 1:
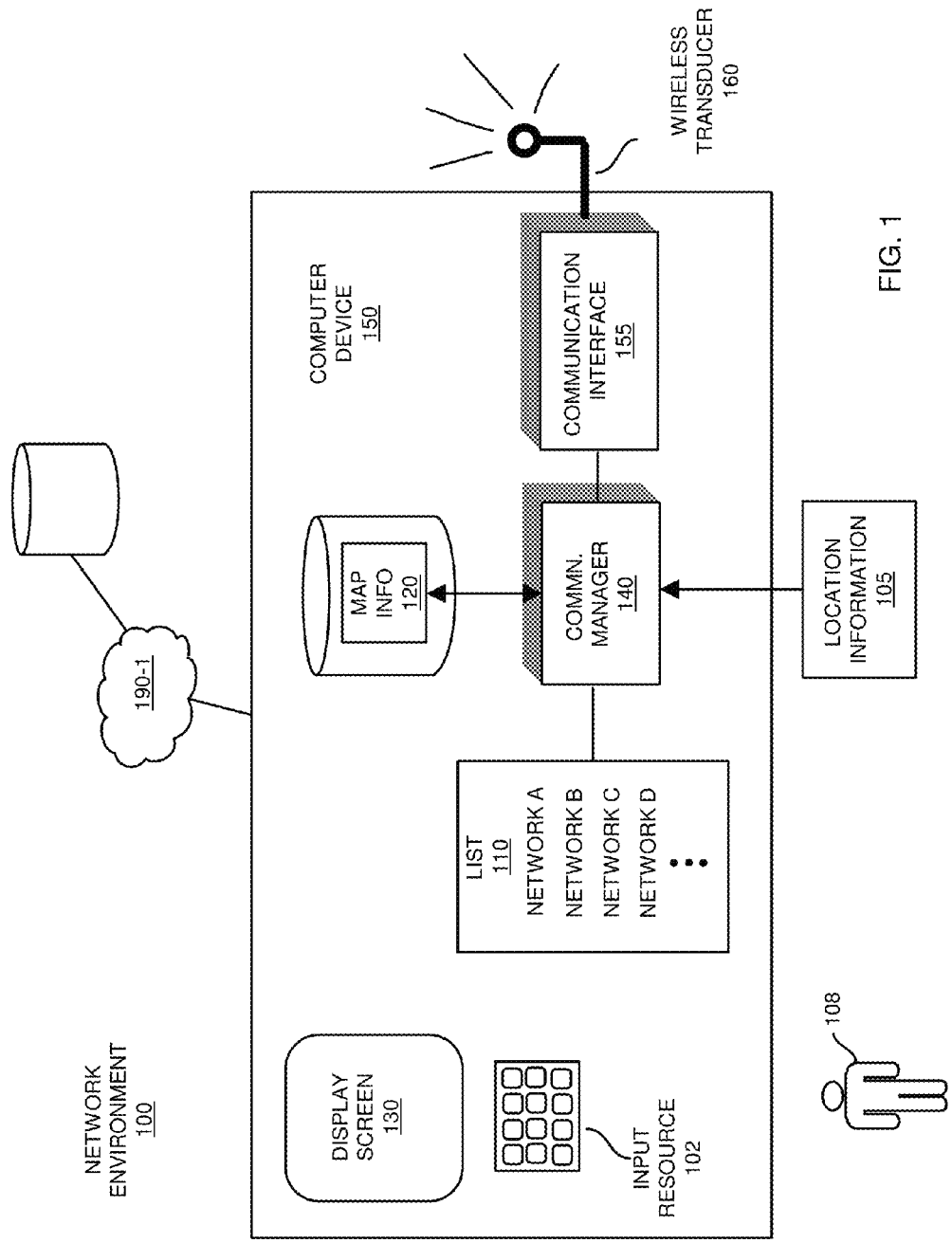
FIG. 1 is an example diagram illustrating a communication device operating in a network environment according to embodiments herein.

More specifically, FIG. 1 is an example diagram of a computer device according to embodiments herein.

As shown, computer device 150 resides and roams in network environment 100. Computer device 150 includes a display screen 130, input resource 102, network manager 140, and communication interface 155.

By way of a non-limiting example, the computer device 150 can be any suitable resource such as a mobile communication device, phone, personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, etc. The computer device 150 may reside at any location or can be included in any suitable resource in network environment 100.

During use, the user 108 controls operation of the computer device 150 via respective input. Input resource 102 can include a keyboard, touchpad, mouse, etc., to input commands and/or other information to the computer device 150.

One embodiment herein includes facilitating connectivity of the computer device 150 to one or more WiFi networks depending on its current location. For example, assume in this example that the user 108 provides input to open a browser to browse a network. The user 108 may be in transit and desire to establish a wireless communication link to communicate over a network such as the Internet.

In response to receiving input to establish a wireless connection, the communication manager 140 first determines a current location of the computer device 150. In one embodiment, the communication manager 140 determines a location of the computer device 150 based on received location information 105.

Figure 2:
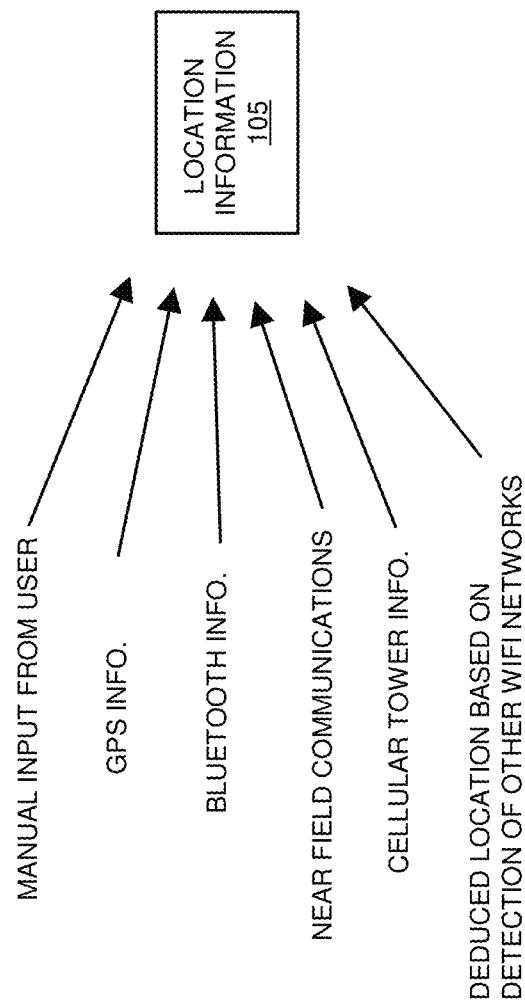
FIG. 2 is an example diagram illustrating different types of sources from which to derive location information according to embodiments herein.

As shown in FIG. 2, location information can be received from one or more sources. For example, the location information 105 can include and/or be derived from: i) information manually inputted from the user 108, ii) GPS information received from GPS device, iii) bluetooth information, iv) near field communication data, cellular tower information, v) deduced location information based on detection of other WiFi networks, etc.

The computer device 150 utilizes the location information 105 to identify the geographical location in which the computer device resides. The determination of geographical location can be based on one or more of the above types of information available in location information 105.

In one example embodiment, the communication manager 140 notifies (e.g., requests) a user 108 to manually input the location information 105 indicating the geographical location of the computer device 150 and/or user 108. The request can be audible and/or visually displayed on the display screen 130.

The user 108 can input the location information 105 in any suitable manner. For example, in one embodiment, the user 108 may provide building number, street, city, etc., to indicate a current location of the computer device 150.

In accordance with another embodiment, the user can initiate display of a map on display screen 130. In such an instance, the user 108 can select a location on the displayed map. The communication manager 140 utilizes the location selected on the map as the current location of the computer device 150.

As an alternative to requiring manual input from the user 108, further embodiments herein include: determining the geographical location of the computer device 150 based on GPS (Global Positioning System) information; determining the geographical location in which the computer device resides based on receipt of an identifier of a cell phone tower providing wireless coverage to subscribers present in the geographical location, and so on.

Accordingly, the communication manager 140 can receive the location information 105 and determine a current location of the computer device 150 in a number of different ways.

Referring again to FIG. 1, via receipt of the location information 105, the communication manager 140 knows a particular or approximate geographical location in which a computer device 150 resides. In one embodiment, the communication manager 140 utilizes the location information to produce a list 110 specifying multiple WiFi networks present in a vicinity of the geographical location as specified by the location information 105.

For example, in one non-limiting embodiment, the communication manager 140 utilizes map information 120 to identify one or more WiFi network resources (e.g., wireless networks, WiFi access points, etc.) located in a vicinity of the geographical region in which the computer device 150 resides. In such an instance, based on the received location information 105, the communication manager 140 populates list 110 to include one or more identified WiFi network resources in a vicinity of the computer device 150.

Thus, in one embodiment, via map information 120, the communication manager 140 is able to identify nearby WiFi network resources.

Assume in this example that, based on a current location of the computer device 150 as specified by location information 105, list 110 produced by communication manager 140 specifies that the computer device 150 is in reasonably close proximity to the networks A, B, C, D, . . . and that the computer device 150 can potentially communicate over one or more of network A, network B, network C, network D, etc.

By further way of a non-limiting example, the communication manager 140 can be configured to retrieve multiple network identifiers from the list 110. Each network identifier in the list 110 can be a unique network resource identifier value such as an SSID (e.g., code and/or name of a WiFi network). Thus, as an alternative to transmitting a wireless query communication in a given region to learn of a presence of network resources, embodiments herein include utilizing the location information 105 to identify a set of one or more network resources that have been registered or discovered as being present at the current geographical location.

Map information 120 used to convert location information 105 into respective list 110 indicating network resources in a respective geographical region can be generated in a number of different ways. For example, the map information 120 can track different network resources discovered by computer device 150 on previous occasions when the computer device 150 resides in a respective geographical location. More specifically, a user may visit a respective geographical location and discover a presence of WiFi network resources X, Y, and Z. The communication manager 140 can be configured to update the map information to reflect that network resources X, Y, and Z are available in a particular region. The map information 120 can be updated to include network resource K if the computer device 150 newly discovers network resource K on a subsequent visit.

Additionally, note that the map information 120 can include a mapping of different locations and corresponding network resources registered to be present in each of the different locations. For example, WiFi network service providers can input network resource availability/region information to a central repository that keeps track of such information. The computer device 150 can be configured to retrieve the location/network resource information and store it as map information 120. When roaming about different geographical areas, the computer device 150 can be configured to access the map information 120 to identify available network resources.

Connectivity to a respective WiFi network in a vicinity of the computer device 150 can be achieved in a number of ways.

In a first example embodiment, subsequent to display of list 110, the user 108 manually selects a particular network from the list 110 to indicate which of multiple networks to establish a wireless communication link.

For example, in this first embodiment, the communication manager 140 initiates display of the network identifiers in the list 110 on display screen 130 of the computer device 150. Each of the network identifiers in the list 110 specifies a corresponding WiFi network and/or resource the geographical location in which the computer device 150 resides.

Based on input from the user 108 through input resource 102, the communication manager 140 receives selection of a particular identifier value from the displayed list 110. In this example, assume that the user 108 selects network B (amongst network A, B, C, D, . . . ) as a means with which to communicate with one or more remote resources over a network such as the Internet. In this instance, the communication manager 140 provides appropriate notification and/or control signals to communication interface 155 to establish a wireless network connection between the communication interface 155 of computer device 150 and the selected WiFi network (e.g., network B).

Subsequent to receiving the request to create the wireless communication link based on network B, the communication interface 155 attempts to establish a communication session and/or link and communicate with resources such as a WiFi access point associated with the selected network B. One way to check whether the selected network B is active at the current geographical in which the computer device 150 resides is to transmit a wireless query from the computer device 150 to learn of any active WiFi networks in the region. In response to the query, assume that an access point associated with network B sends back (to communication interface 155 of computer device 150) the identifier value associated with network B. This confirms that the computer device 150 can at least communicate with a WiFi access point associated with network B.

In a similar manner, via one or more wirelessly transmitted queries in a region, the computer device 150 can learn if any of the other network such as networks A, C, D, etc., are present and available at the location in which the computer device 150 resides.

In one embodiment, if the network B is active and available for use by the user 108, the communication interface 155 sets up a communication link or establishes a session between the computer device 150 and an access point (e.g., base station) associated with network B.

In one embodiment, the computer device 150 provides the WiFi access point its network address. Acting as a proxy to the computer device 150, the WiFi access point uses the network address associated with the computer device 150 as a basis to transmit and receive data on behalf of the computer device 150. For example, the WiFi access point receives outbound data from one or more applications executed on computer device 150 over the wireless communication link. The WiFi access point forwards such outbound data to appropriate resources in a target resource in a network. The WiFi access point forwards data received from remote resources over the wireless communication link to the appropriate one or more applications executing on computer device 150.

As an alternative to manual selection of a particular network resource by a user to indicate which of multiple networks to establish a WiFi network communication link, in a second embodiment, the communication manager 140 automatically creates a wireless communication link (e.g., WiFi network link) in accordance with pre-established configuration information provided by the user 108 or other source.

For example, in accordance with such an embodiment, the communication manager 140 of computer device 150 automatically attempts to establish connectivity with one or more WiFi networks as specified in the list 105 in response to a trigger event such as the user 108 executing an application (e.g., browser application) to surf the web. In such an instance, the communication manager 140 attempts to establish connectivity with one or more of the multiple WiFi networks as specified in the list 110.

For example, assume that the communication manager 140 initially attempts to connect computer device 150 to network A. If the attempt to connect to network A fails, such as because the network A is inactive or the computer device 150 is not within range to communicate with resources associated with network A, the communication manager 140 attempts to communicate with another WiFi network (e.g., network B) as specified in the list 110. If the attempt to connect to network B fails, such as because the network B is inactive or the computer device 150 is not within range to communicate with network B, the communication manager 140 attempts to communicate with another WiFi network (e.g., network C) as specified in the list 110. In this manner, the communication manager 140 can be configured to repeat attempts until an appropriate one or more network connection is established with a network as specified by the list 110.

By further way of a non-limiting example, the computer device 150 can be configured to store historical and/or preference information associated with the user 108 in order to determine which of multiple possible networks to establish the wireless communication link. For example, the user 108 may have frequented a particular location many times in the past and prefer one network over other potentially available networks. In such an instance, when the communication manager 140 detects that the computer device 150 is located in a particular region based on location information 105, the communication manager 140 can retrieve favorites information indicating a predetermined order of priority such as network B, C, A. In such an embodiment, the communication manager 140 initially attempts to establish the wireless communication link with network B, followed by network C if the attempt with network B fails, followed by network A if the attempt with network C fails, and so on. Thus, embodiments herein can include receiving favorite WiFi network information as pre-specified by an operator of the computer device 150 prior to obtaining the location information 105 and establishing a wireless connection between the computer device 150 and the favorite WiFi network.

Figure 3:
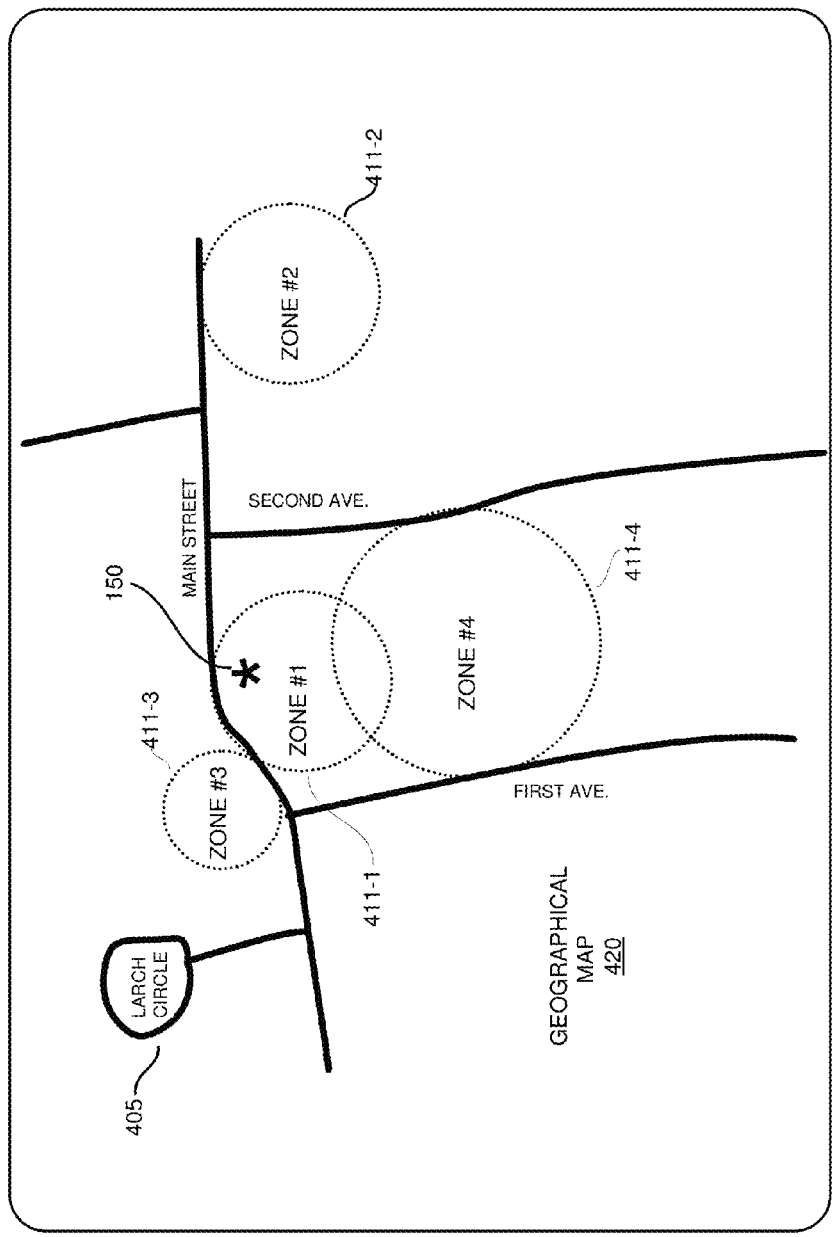
FIG. 3 is an example diagram illustrating multiple zones of wireless coverage in a geographical region according to embodiments herein.

FIG. 3 is an example diagram illustrating multiple zones of wireless coverage in a geographical region according to embodiments herein.

Geographical region 420 includes multiple different zones of wireless coverage 411. Each of the zones can include one or more WiFi network resources enabling users to communicate over a main network.

By way of a non-limiting example, zone #1 includes one or more WiFi networks providing network access to members within wireless coverage 411-1; zone #2 includes one or more WiFi networks providing network access to members within wireless coverage 411-2; zone #3 includes one or more WiFi networks providing network access to members within wireless coverage 411-3; zone #4 includes one or more WiFi networks providing network access to members within wireless coverage 411-4, and so on.

The asterisk "*" indicates a current location of computer device 150 as specified by location information 105.

When roaming from one location to another, the computer device 150 can be configured to detect such movement based on continuously updated location information 105. For example, in one embodiment, the communication manager 140 can detect precise movements of the computer device 150 based on the updated location information 105. The location information 105 can indicate movement of the computer device 150 about multiple geographical regions. The communication manager 140 can utilize the updated location information 105 as a basis to connect to different WiFi networks, via handoffs, as the user 108 and respective computer device 150 move through the geographical regions. For example, assume that the location information 105 indicates that the user 108 and computer device 150 reside in zone #1 as shown in geographical map 420 of FIG. 3. In response to receiving updated location information 105 indicating that the computer device 150 resides in zone #4, the communication manager 140 can update list 110 at the new geographical region and connect to a network resource present in zone #4. In one embodiment, the handoff from a network (e.g., network B2) in zone #1 to a network (e.g., B7) in zone #4 can be seamless. That is, the user may experience uninterrupted connectivity with a network even though a handoff occurs.

FIG. 4 is an example diagram illustrating an example of map information according to embodiments herein.

As shown, map information 120-1 can include an identifier value for each of the zones as well as a list of one or more WiFi network resources that support wireless communications in the zone.

In this non-limiting example embodiment, the map information 120-1 indicates that zone #1 includes multiple available WiFi networks including network A1, network B2, network C5, and network D2; the map information 120-1 indicates that zone #2 includes multiple available WiFi networks including network A3, network X2, network K4, and network M; the map information 120-1 indicates that zone #3 includes multiple available WiFi networks including network A6 and network B5; the map information 120-1 indicates that zone #4 includes multiple available WiFi networks including network B7, network D3, and network X5, and so on.

Note that the networks A1, A3, A6, . . . may be owned and operated by a first service provider; networks B2, B5, B7, . . . may be owned and operated by a second service provider; and so on. When transitioning from one network to another in response to roaming as discussed above, the communication manager 140 can give preference to connecting to WiFi networks associated with a common service provider. As an example, when detecting movement from zone #1 to zone #4, the communication manager 140 can be configured to stay within a service provider and select network D3 in zone #4 and drop a previously established connection to network D2 in zone #1.

Of course, if desired, the user 108 can override such an option and configure the communication manager 140 to connect to any suitable network when transitioning to the new region.

As previously discussed, the map information 120-1 enables the communication manager 140 to identify one or more WiFi networks available in a given region in which the computer device 150 resides. For example, assume that the communication manager 140 receives location information 105 indicating that the computer device 150 resides in location as marked by the asterisk in geographical map 420. Based on map information 120-1, the communication manager 140 identifies that the computer device 150 resides in zone #1.

In this example, list #1 is assigned to zone #1 and indicates that zone #1 is a WiFi hotspot including network A1, network B2, network C5 and network D2.

Accordingly, embodiments herein include mapping the location information 105 to a particular list amongst multiple possible lists. Each of the multiple lists is associated with a different geographical location and/or region. That is, list 1 indicates network resources registered as being available in zone #1; list 2 indicates network resources registered as being available in zone #2; list 3 indicates network resources registered as being available in zone #3; and so on.

As an alternative to maintaining a list of networks supported by each zone, embodiments herein can include map information 120 that keeps track of different WiFi network resources and corresponding locations and/or regions of wireless coverage provided by each WiFi network resource. In such an embodiment, the communication manager 140 produces a list of WiFi network resources that are potentially available to the computer device 150 because of the close proximity of the computer device 150 to the resources.

Figure 5:
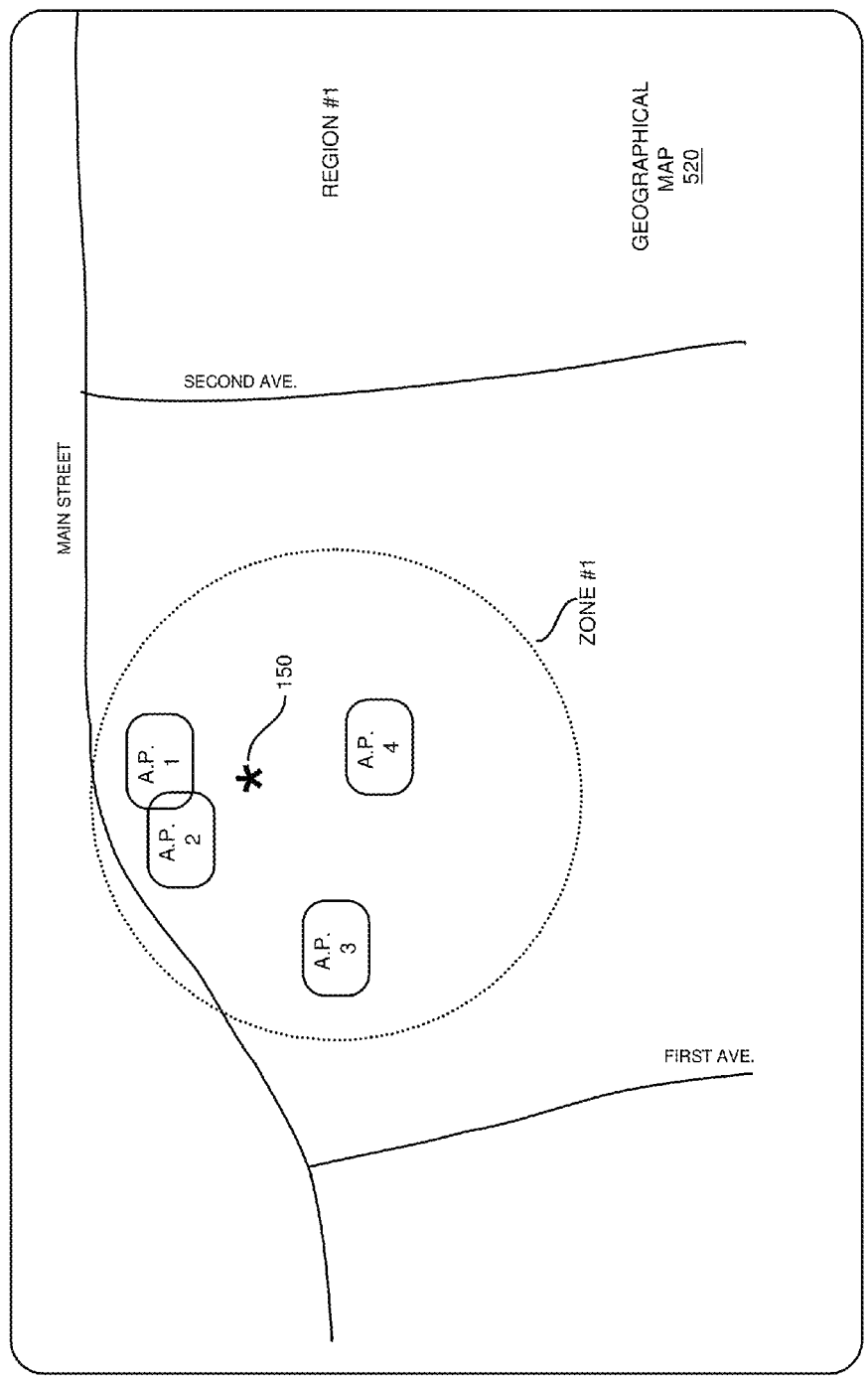
FIG. 5 is an example diagram illustrating network resources registered as being present in a geographical region according to embodiments herein.

More specifically, FIG. 5 is an example diagram illustrating network resources present in a geographical region 520 according to embodiments herein. In this example embodiment, assume that location information 105 indicates that the computer device 150 resides at the location marked by the asterisk. The computer device 150 is reasonably close in proximity to access point A1, access point B2, access point C5, and access point D2.

FIG. 6 is an example diagram illustrating an example of map information according to embodiments herein. In this example embodiment, map information 120-2 specifies a location and/or region of coverage supported by each of the network resources (e.g., access points).

Based on the proximity of the computer device 150 to a respective network resource, the communication manager 140 produces the list 110. In this example, assume that the computer device 150 resides in a region of wireless coverage associated with access point 1, access point 2, and access point 3. In such an instance, the communication manager 140 produces the list 110 to include identities of access point 1, access point 2, and access point 3.

In accordance with further embodiments, note that the communication manager 140 can be configured to initiate display of a geographical map (e.g., similar to geographical map 420 or geographical map 520) of the current geographical location of the computer device 150 on display screen 130. The communication manager 140 can generate the geographical map to include markers (e.g., symbols) indicating locations of WiFi resources such as access points associated with each WiFi network as specified in the list. The symbols can indicate wireless coverage provided by each of multiple network resources in a region as well as shown, or alternatively, indicate a location of access points in a region. Accordingly, via display of such information on display screen 130, the user 108 can view the location of and/or region of wireless coverage associated with each of the one or more WiFi network resources.

Figure 7:
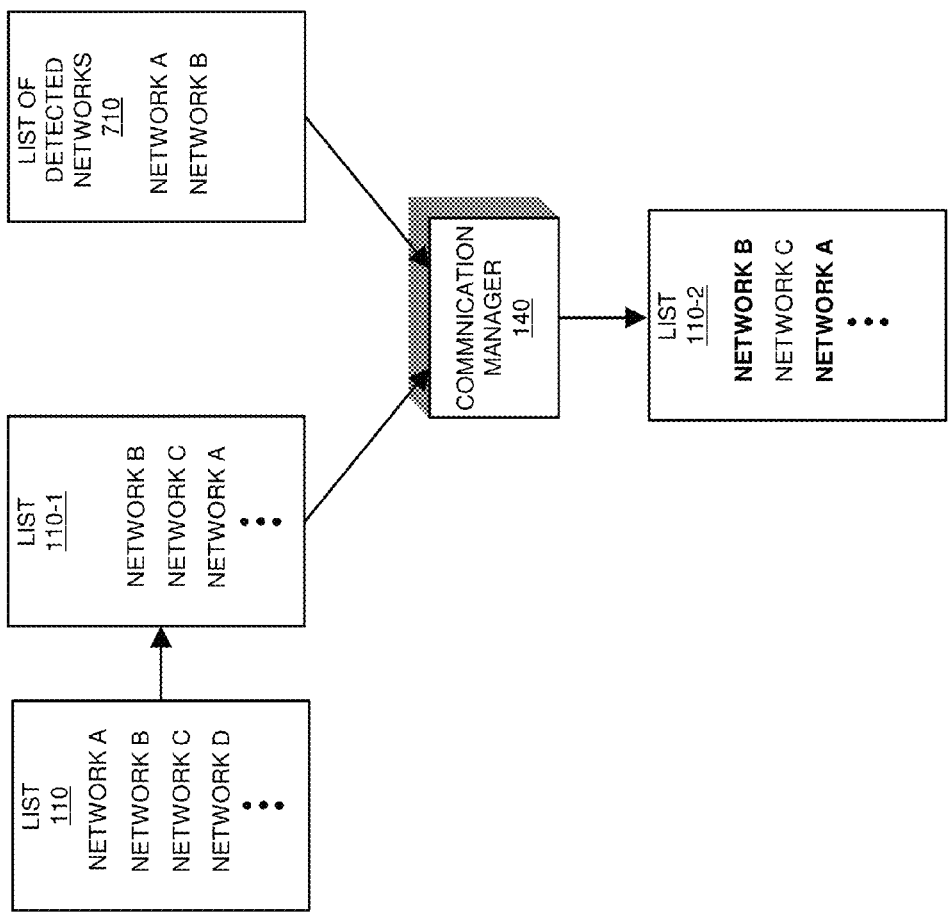
FIG. 7 is an example diagram illustrating processing and comparison of detected active network resources in a geographical region versus network resources expected be present in the geographical region according to embodiments herein.

FIG. 7 is an example diagram illustrating a comparison according to embodiments herein.

As previously discussed, the communication manager 140 can be configured to produce list 110 indicating one or more network resources that are registered and/or discovered as being available in a particular region in which the computer device 150 and/or user 108 resides.

As previously discussed, the user 108 of the computer device 150 can store configuration information indicating favorite network resources as specified by the user 108.

In one embodiment, the communication manager 140 modifies the list 110 to produce modified list 110-1 based on the favorites configuration information. As an example, the user 108 can specify that they never want to connect to a remote network via use of network D; thus, network D does not appear in list 110-1. The user's favorites information can further indicate that network B is desired over network C, network C is desired over network A, and so on. List 110-1 reflects the favorites. Thus, when a person and respective computer device 150 is in a particular area and a user desires to connect to an access point to obtain access to a remote resource such as a web server, the list indicates the candidate networks to which the user 108 can connect.

In accordance with yet further embodiments, in addition to producing list 110 and/or list 110-1 including resources that are registered to be available in a particular region, the communication manager 140 can be configured to physically monitor for a presence of wireless signals in the geographical location (in which the computer device 150 resides) to identify one or more active WiFi resources available and operating in the geographical location.

The communication manager 140 can be informed of the active WiFi networks via any suitable method such as receipt of multiple SSIDs from one or more of the network resources operating in a particular region. As a more specific non-limiting example, the computer device 150 can be configured to transmit a wireless query signal to learn of the different access points in a particular region. If desired, the communication manager 140 can further monitor a wireless signal strength of each of the multiple access points to determine which access points provide a better signal for wireless communications.

Assume in this example that the communication manager 140 detects the presence of only network A and network B as indicated by list 710 in the current geographical location of computer device 150. In accordance with such an embodiment, the communication manager 140 processes list 110-1 and list 710 and produces corresponding list 110-2. The marked (e.g., bolded, highlighted, etc.) network resources in list 710 indicate the network resources available for use by the user 108 because they are known to be active and available. In one embodiment, the communication manager 140 merges the list of registered network resources with the list of actually detected resources to produce list 110-2.

In accordance with further embodiments, the communication manager 140 selects, from the identified one or more active WiFi networks in list 110-2, a WiFi network that is highest priority in the list 110-2. This corresponds to network B in this example. Thereafter, subsequent to selection, the communication manager 140 establishes the wireless connection between the computer device 150 and the selected WiFi network B. If network B is not available or active, the communication manager 140 attempts connectivity with A (assuming that network C is unavailable). Accordingly, embodiments herein include attempting connectivity with each of multiple WiFi networks in the modified list 110-2 based on a predetermined order of priority as specified by the list 110 and/or list 110-2.

In accordance with yet further embodiments, the comparison of pre-registered or previously discovered WiFi network resources (as indicated by map information 120) to a list of active WiFi network resources in a region (detected based on transmitting a query in the region) can be used such as a basis to update the map information 120. That is, the communication manager 140 and/or other suitable resource can be configured to update the list 110 and/or map information 120 to reflect the newly discovered WiFi network resource in the geographical region. The user 108 can provide input indicating a degree to which any newly detected networks are favorites and deserve higher priority over other possible available networks in a region.

Note further that a user 108 may operate the computer device 150 in a particular zone that includes redundant network coverage. That is, a given zone may include multiple possible network resources available to connect the computer device 150 to one or more WiFi networks.

In one embodiment, the location information 105 can reflect precise movement of the computer device 150 in the zone. As an example, the zone may be a home or building including multiple available WiFi networks. Each location in the building can include a location transmitter to notify the user of which room they reside as they roam about the building with their computer device 150. In other words, the use can detect based on being in close proximity to a respective transmitter that they are located in one room or location versus another even though they may reside within a same zone.

Thus, in one non-limiting example, the communication manager 140 can receive information that the computer device 140 is located in a particular room of the building. Even though a group of multiple WiFi networks may be available for use at the particular location in the building, the communication manager 140 can be configured to connect to a first network in the group of multiple networks available in the building based on knowing that the computer device 150 is located at the particular location.

Assume that the user moves from the particular location to a new location in the building. The group of multiple WiFi networks associated with the building still may be available for use by the computer device 150 at the new location. However, via updated location information 105, the communication manager 140 can identify that the user 108 moved to the new location in the building. The mapping process as discussed above can include identifying that the user 108 and computer device 150 moved to the new location in the building. In response to such a condition, assuming that the new location maps to a second network in the group (e.g., that the use 108 would like to connect to a second network that has been associated with the new location, the communication manager 140 connects the computer device to the second network in the group. Accordingly, the location of the user 108 and/or computer device 150 can be used as a basis to connect the computer device 150 to a WiFi network resource as opposed to merely connecting the computer device 150 to any available WiFi network in a region.

Figure 8:
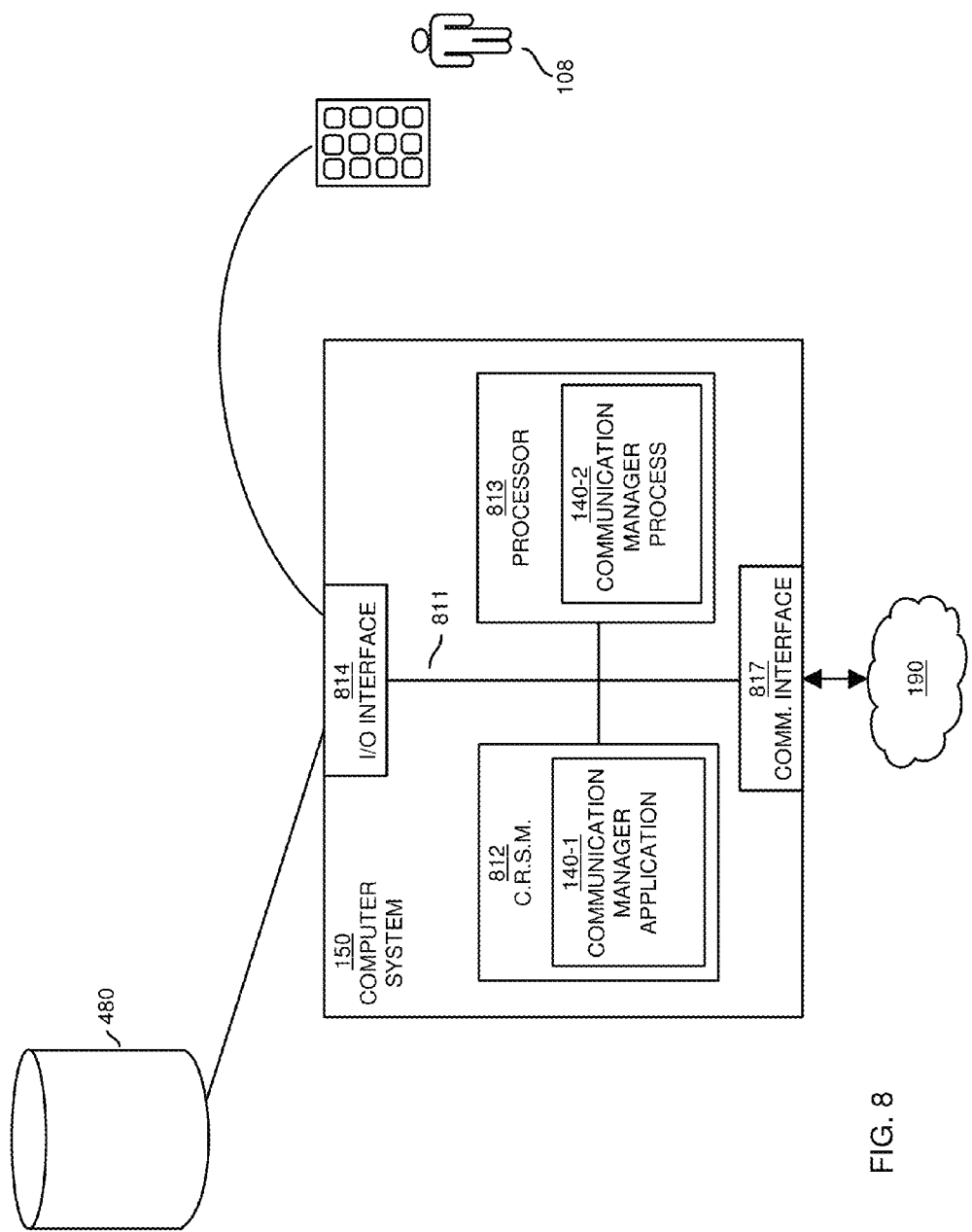
FIG. 8 is an example diagram illustrating a computer architecture in which to execute one or more embodiments as discussed herein.

FIG. 8 is an example block diagram of a computer system for implementing any of the operations as discussed herein according to embodiments herein.

As shown, computer system 150 of the present example can include an interconnect 811 that couples computer readable storage media 812 such as a non-transitory type of media (i.e., any type of hardware storage medium) in which digital information can be stored and retrieved, a processor 813, I/O interface 814, and a communications interface 817.

I/O interface 814 provides connectivity to a repository 480 and, if present, other devices such as a playback device 130, keypad, a computer mouse, etc.

Computer readable storage medium 812 can be any hardware storage device such as memory, optical storage, hard drive, floppy disk, etc. In one embodiment, the computer readable storage medium 812 stores instructions and/or data.

Communications interface 817 enables the computer system 150 and processor 813 to communicate over a resource such as network 190 to retrieve information from remote sources and communicate with other computers. I/O interface 814 enables processor 813 to retrieve stored information from repository 480.

As shown, computer readable storage media 812 is encoded with communication manager application 140-1 (e.g., software, firmware, etc.) executed by processor 813.

Communication manager application 140-1 can be configured to include instructions to implement any of the operations as discussed herein.

During operation of one embodiment, processor 813 accesses computer readable storage media 812 via the use of interconnect 811 in order to launch, run, execute, interpret or otherwise perform the instructions in communication manager application 140-1 stored on computer readable storage medium 812.

Execution of the communication manager application 140-1 produces processing functionality such as communication manager process 140-2 in processor 813. In other words, the communication manager process 140-2 associated with processor 813 represents one or more aspects of executing communication manager application 140-1 within or upon the processor 813 in the computer system 150.

Those skilled in the art will understand that the computer system 150 can include other processes and/or software and hardware components, such as an operating system that controls allocation and use of hardware resources to execute communication manager application 140-1.

In accordance with different embodiments, note that computer system may be any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 150 may reside at any location or can be included in any suitable resource in network environment 100 to implement functionality as discussed herein.

Functionality supported by the different resources will now be discussed via flowcharts in FIGS. 9-12. Note that the steps in the flowcharts below can be executed in any suitable order.

Figure 9:
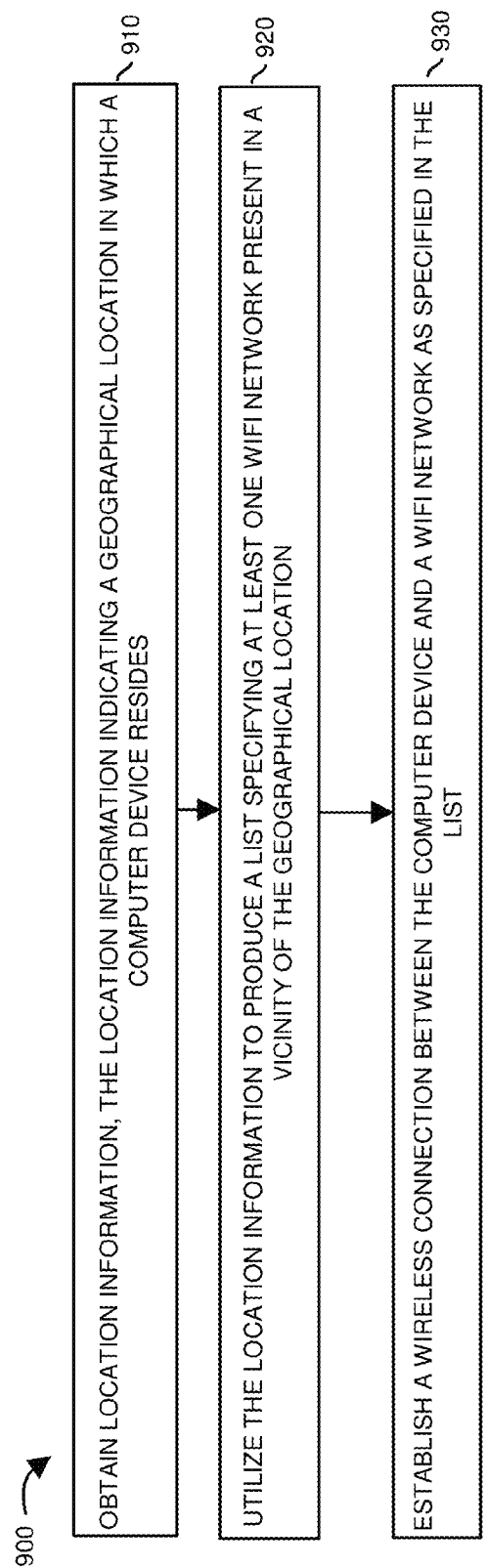
FIG. 9 is an example diagram illustrating a method of determining which of one or more WiFi network resources are registered to be available to a computer device residing in a geographical region according to embodiments herein.

FIG. 9 is a flowchart 900 illustrating an example method of providing access to a network according to embodiments. Note that there will be some overlap with respect to concepts as discussed above.

In step 910, the communication manager 140 obtains location information 105. The location information 105 indicates a geographical location in which the computer device 150 resides.

In step 920, the communication manager 140 utilizes the location information 105 to produce a list 110 specifying at least one WiFi network present in a vicinity of the geographical location in which the computer device 150 resides.

In step 930, the communication manager 140 establishes a wireless connection (e.g., a WiFi communication link) between the computer device 150 and a WiFi network as specified in the list 110.

Figure 10:
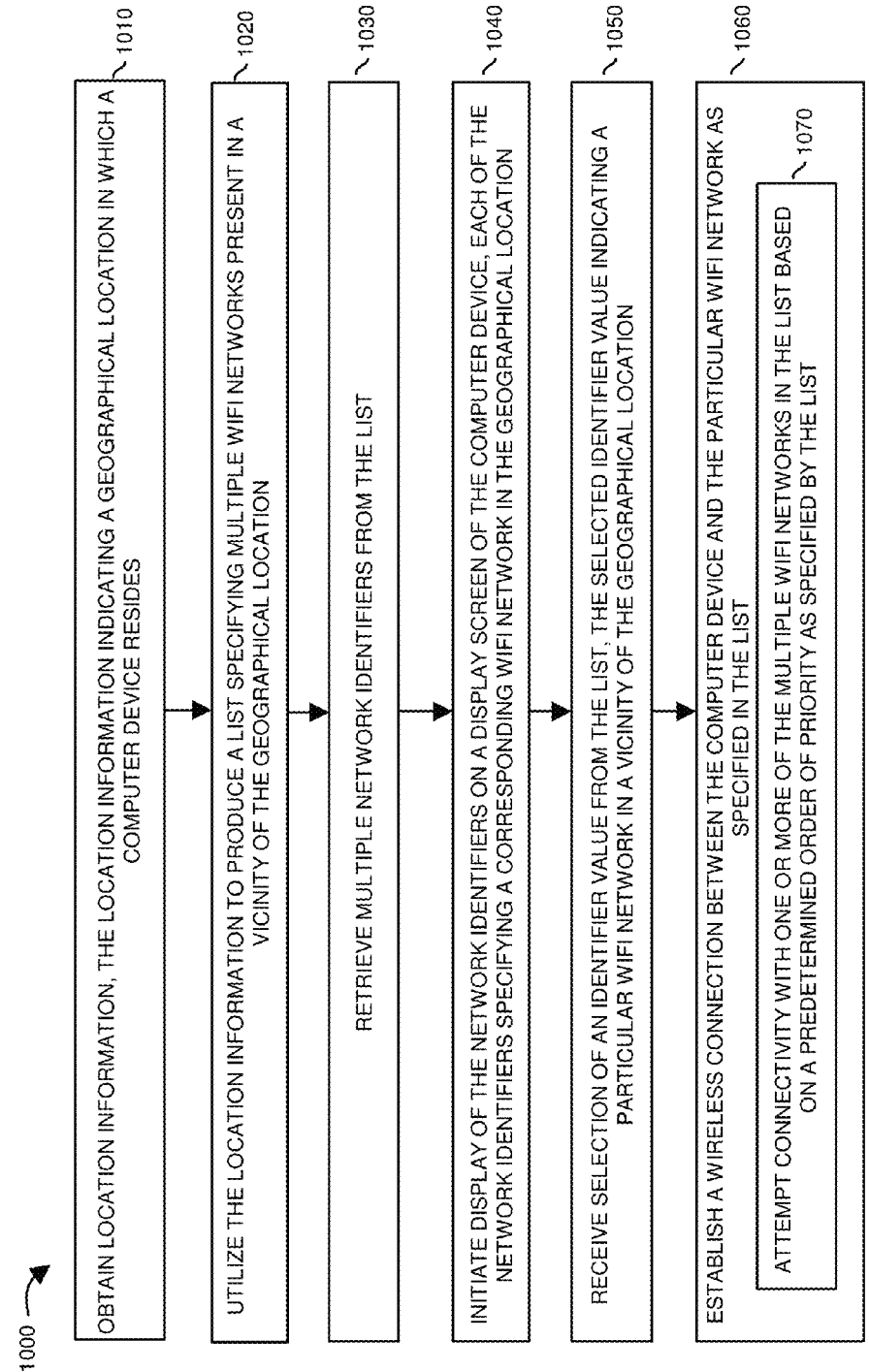
FIG. 10 is an example diagram illustrating a method according to embodiments herein.

FIG. 10 is a flowchart 1000 illustrating an example method according to embodiments. Note that there will be some overlap with respect to concepts as discussed above.

In step 1010, the communication manager 140 receives location information 105. The location information 105 indicates a geographical location in which the computer device 150 resides.

In step 1020, the communication manager 140 utilizes the location information 105 to produce a list 110 specifying multiple WiFi networks (i.e., WiFi network resources) present in a vicinity of the geographical location as specified by the location information 105.

In step 1030, the communication manager 140 retrieves multiple network identifiers from the list 110.

In step 1040, the communication manager 140 initiates display of the network identifiers on a display screen 130 of the computer device 150 for viewing by the user 108. Each of the displayed network identifiers specifies a corresponding WiFi network in the geographical location in which the computer device 150 resides.

In step 1050, the communication manager 140 receives selection of an identifier value from the list 110; the selected identifier value indicates a particular WiFi network resource located in a vicinity of the geographical location in which the computer device 150 resides.

In step 1060, the communication manager 140 establishes a wireless connection between the computer device and the particular WiFi network resource selected from the list 110.

In sub-step 1070 associated with step 1060, the communication manager 140 attempts connectivity with one or more of the multiple WiFi networks and/or resources in the list 110 based on a predetermined order of priority if an initiate attempt to connect fails.

Figure 11:
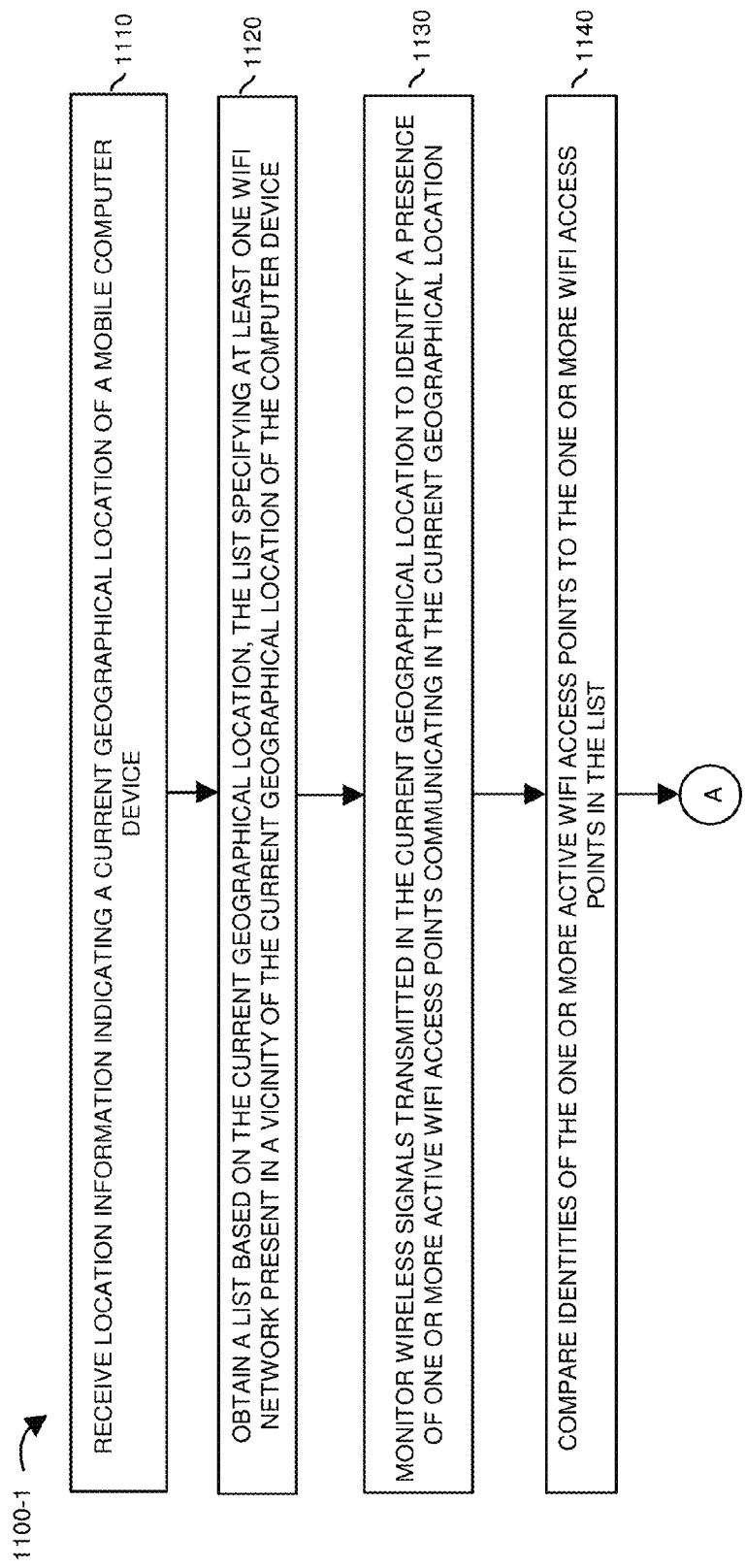
FIGS. 11 and 12 combine to form an example method according to embodiments herein.
Figure 12:
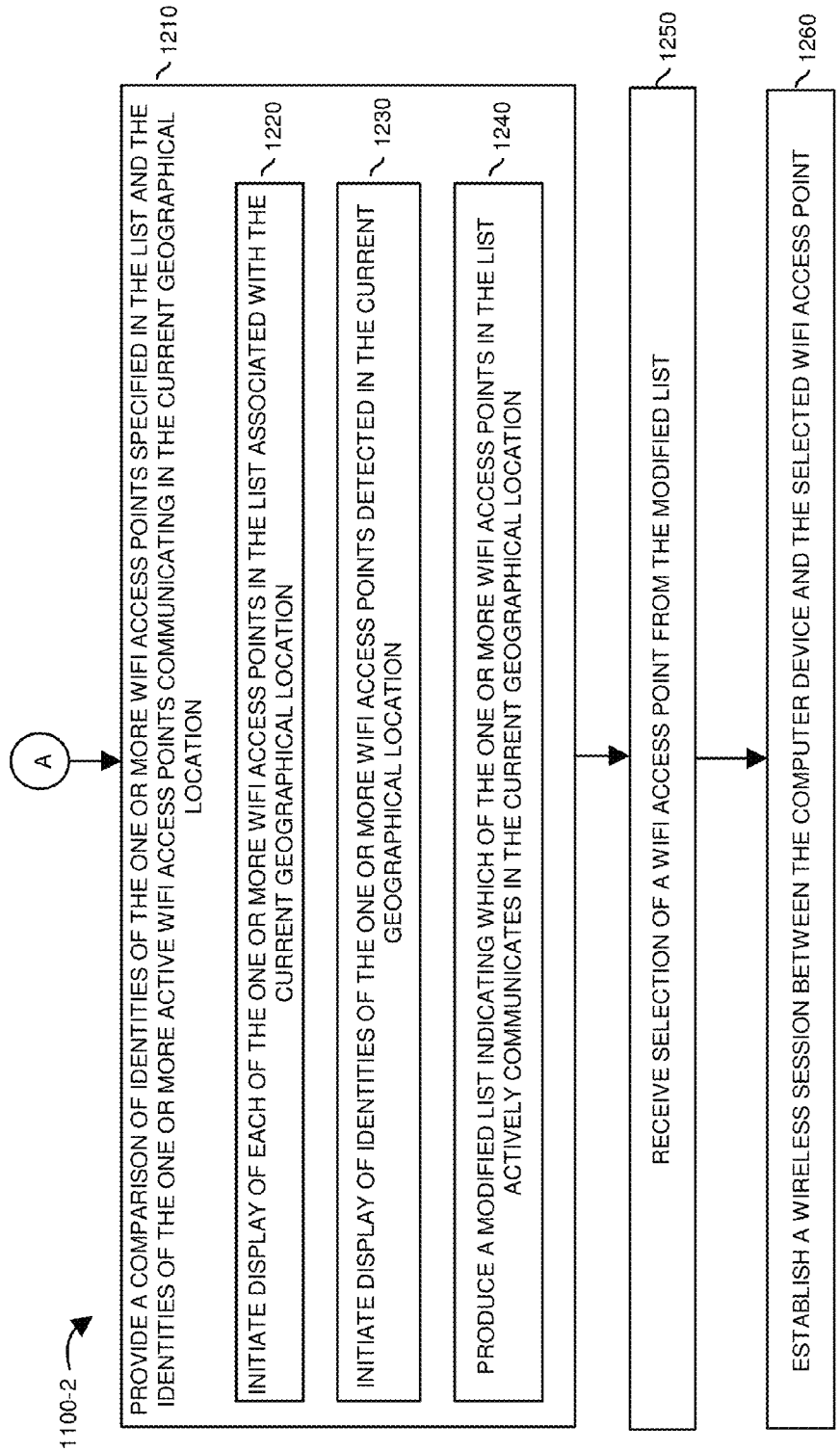

FIGS. 11 and 12 is a flowchart 1100 (e.g., flowchart 1100-1 and flowchart 1100-2) illustrating an example method of providing access to a network according to embodiments herein. Note that there will be some overlap with respect to concepts as discussed above.

In step 1110, the communication manager 140 receives location information 105 indicating a current geographical location of a (mobile) computer device 150.

In step 1120, the communication manager 140 the communication manager 140 produces a list 110 based on the current geographical location in which the computer device 150 resides. The list specifies at least one WiFi network present in a vicinity of the current geographical location of the computer device 150.

In step 1130, the communication manager 140 monitors wireless signals transmitted in the current geographical location to identify a presence of one or more active WiFi access points communicating in the current geographical location.

In step 1140, the communication manager 140 compare identities of the one or more active WiFi access points to the one or more WiFi access points in the list 110.

In sub-step 1210 in flowchart 1100-2, the communication manager 140 provides a comparison of identities of the one or more WiFi access points specified in the list 110 and the identities of the one or more active WiFi access points communicating in the current geographical location.

In step 1220, the communication manager 140 initiates display of each of the one or more WiFi access points in the list associated with the current geographical location of the computer device 150.

In step 1230, the communication manager 140 initiates display of identities of the one or more WiFi access points detected in the current geographical location.

In step 1240, the communication manager 140 produces a modified list 110-2 indicating which of the one or more WiFi access points in the list actively communicates in the current geographical location.

In step 1250, the communication manager 140 receives selection of a WiFi access point from the modified list 110-2.

In step 1260, the communication manager 140 establishes a wireless session (e.g., wireless communication link) between the computer device 150 and the selected WiFi access point.

Note again that techniques herein are well suited for distributing content encoded at different levels of quality in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method to establish a WiFi connection comprising operations of:
in a computer device:
obtaining location information, the location information indicating a geographical location in which the computer device currently resides;
utilizing the location information to produce a list specifying at least one WiFi network present in a vicinity of the geographical location, the computer device originating the list based on map information stored in the computer device, the map information specifying the at least one WiFi network present in the vicinity of the geographical location; and
establishing a wireless WiFi connection between the computer device and a WiFi network as specified in the list;
wherein established the wireless WiFi connection includes: selecting a WiFi access point from the list; and transmitting a network address of the computer device to the selected WiFi access point, the selected WiFi access point acting as a proxy to the computer device as a basis to transmit and receive data on behalf of the computer device, the method further comprising:
executing a browser application on the computer device;
forwarding outbound data from the browser application on the computer device through the selected WiFi access point to target resources in a remote network; and
receiving inbound data from the target resources through the selected access point, the inbound data directed to the browser application executing on the computer device.

2. The method as in claim 1, wherein the list includes an indication of multiple WiFi networks present in the geographical location; and
wherein establishing the wireless connection includes attempting connectivity with the multiple WiFi networks in the list based on a predetermined order of priority as specified by the list; and
in response to a failed attempt to connect to a first WiFi network as specified in the list, attempting to connect to a second WiFi network as specified in the list.

3. The method as in claim 1 further comprising:
receiving selection of an SSID identifier value from the list, the selected SSID identifier value indicating a particular WiFi network in a vicinity of the geographical location; and
establishing the wireless connection between the computer device and the particular WiFi network as specified in the list, the selected WiFi access point residing in the WiFi network.

4. The method as in claim 1 further comprising:
monitoring a presence of wireless signals in the geographical location to identify at least one active WiFi network in the geographical location;
comparing the identified at least one WiFi network to the list;
selecting, from the identified at least one active WiFi network, a WiFi network that is highest priority in the list; and
establishing the wireless connection between the computer device and the selected WiFi network.

5. The method as in claim 1, wherein obtaining the geographical information includes:
notifying a user of the computer device to manually input the location information indicating the geographical location; and
receiving the geographical information based on the input from the user operating the computer device.

6. The method as in claim 1, wherein the list includes a favorite WiFi network as pre-specified by an operator of the computer device prior to obtaining the location information; and
via the selected WiFi access point, establishing the wireless connection between the computer device and the favorite WiFi network.

7. The method as in claim 1, wherein the list is a particular list; and
wherein utilizing the location information includes:
mapping the location information to the particular list amongst multiple lists, each of the multiple lists associated with a different geographical location, the particular list being associated with the geographical location in which the computer device currently resides.

8. The method as in claim 1, wherein utilizing the location information includes:
producing the list to include identities of the at least one WiFi network based on prior detecting that each of the at least one WiFi network provides wireless coverage at the geographical location.

9. The method as in claim 1 further comprising:
retrieving network identifiers from the list;
initiating display of the network identifiers on a display screen of the computer device, each of the network identifiers specifying a corresponding WiFi network in the geographical location;
receiving selection of a particular WiFi network from the list based on input from an operator of the computer device; and
establishing the wireless connection between the computer device and the particular WiFi network selected from the list.

10. The method as in claim 1, wherein obtaining the location information includes:
determining the geographical location of the computer device based on GPS (Global Positioning System) information.

11. The method as in claim 1, wherein obtaining the location information includes:
determining the geographical location in which the computer device currently resides based on receipt of an identifier of a cell phone tower providing wireless coverage to subscribers present in the geographical location.

12. The method as in claim 1 further comprising:
initiating display of a geographical map of the geographical location on a display screen of the computer device, the geographical map including markers indicating locations of WiFi access points associated with each WiFi network as specified in the list.

13. The method as in claim 1, wherein the list includes a favorite WiFi network as pre-specified by an operator of the computer device prior to obtaining the location information; and
wherein establishing the wireless connection automatically occurs in response to detecting an attempt by an operator of the computer device to establish the wireless connection.

14. The method as in claim 1, wherein obtaining the location information includes:
determining the geographical location in which the computer device currently resides based on multiple inputs selected from the group consisting of:
i) an identifier of a cell phone tower providing wireless coverage to subscribers present in the geographical location,
ii) GPS (Global Positioning System) information,
iii) Bluetooth™ information, and
iv) near field communications.

15. The method as in claim 1, wherein the list includes multiple WiFi access points in the vicinity of the geographical location, the multiple WiFi access points discovered by the computer device as a result of the computer device transmitting wireless discovery queries to the WiFi access points, the method further comprising:
receiving input from a user of the computer device specifying a priority order in which to attempt establishing the wireless WiFi connection via communications from the computer device to the WiFi access points in the list.

16. The method as in claim 1 further comprising:
prior to obtaining the location information and receiving a request to establish the wireless WiFi connection:
storing the map information in the computer device, the map information indicating multiple WiFi access points disposed in a vicinity of the geographical location; and
updating the map information stored in the computer device to indicate a newly discovered WiFi access point as a result of the computer device receiving a communication from the newly discovered WiFi access point in response to the computer device generating a wireless discovery query in the vicinity of the geographical location to the WiFi access point.

17. The method as in claim 16, wherein the computer device accesses the updated map information to identify available WiFi network resources available in the vicinity of the geographical location.

18. The method as in claim 1 further comprising:
originating the list in response to receiving a request by a user of the computer device to connect to a wireless access point.

19. The method as in claim 1, wherein the list originated by the computer device is generated by the computer device based on a previous occasion when the computer device resided in the geographical location, the computer device discovering the at least one WiFi network present in the geographical location on the previous occasion.

20. The method as in claim 1 further comprising:
producing the map information, the map information including a mapping of different locations and corresponding network resources registered to be present in each of the different locations, the corresponding network resources discovered by the computer device as being present in the different locations prior to receiving a request to establish the wireless WiFi connection;
storing the map information in a repository of the computer device; and
in response to receiving the request to establish the wireless WiFi connection, accessing the map information in the repository to produce the list.

21. The method as in claim 20 further comprising:
initiating display of an identifier value on a display screen of the computer device, the identifier value corresponding to the WiFi network in the geographical location; and
establishing the wireless WiFi connection with the WiFi network in response to receiving selection of the identifier value in the list.

22. The method as in claim 21 further comprising:
prior to establishing the wireless WiFi connection, transmitting a wireless query to the WiFi network to verify that the WiFi network is active; and
receiving a query response from the WiFi network confirming that the WiFi network is active.

23. The method as in claim 2, wherein the second WiFi network is chosen by a user of the computer device, prior to originating the list, as an alternative resource in which to establish the wireless connection in response to detecting that the first WiFi network is inactive.

24. The method as in claim 1 further comprising:
detecting a trigger event in which a user of the computer device executes the browser application on the computer device; and
in response to the trigger event, establishing the wireless WiFi connection between the computer device and the WiFi network as specified in the list, the user of the computer device pre-registering the selected WiFi network in the list as a favorite prior to obtaining the location information.

25. The method as in claim 24, wherein the list originated by the computer device is generated by the computer device based on a previous occasion when the computer device resided in the geographical location, the computer device discovering the at least one WiFi network present in the geographical location on the previous occasion.

26. A method to establish a WiFi connection comprising operations of:
in a mobile computer device:
receiving location information indicating a current geographical location of the mobile computer device;
obtaining a list based on the current geographical location, the list specifying at least one WiFi network present in a vicinity of the current geographical location of the computer device;
monitoring wireless signals transmitted in the current geographical location to identify a presence of at least one active WiFi access point communicating in the current geographical location; and
comparing identities of the at least one active WiFi access point to the at least one WiFi access point in the list to identify which if any of the at least one active WiFi access point as specified in the list is inactive;
selecting a WiFi access point from the list;
transmitting a network address of the computer device to the selected WiFi access point, the selected WiFi access point acting as a proxy to the computer device as a basis to transmit and receive data on behalf of the computer device, the method further comprising:
executing a browser application on the computer device;
forwarding outbound data from the browser application on the computer device through the selected access point to target resources in a remote network; and
receiving inbound data from the target resources through the selected access point, the inbound data directed to the browser application executing on the computer device.

27. The method as in claim 26 further comprising:
providing a visual comparison of identities of the at least one WiFi access point specified in the list and the identities of the at least one active WiFi access point communicating in the current geographical location.

28. The method as in claim 27, wherein providing the comparison includes:
initiating display of identities of each of the at least one WiFi access points in the list associated with the current geographical location; and
initiating display of identities of the at least one active WiFi access points detected in the current geographical location.

29. The method as in claim 26 further comprising:
based on the comparing, producing a modified list indicating which of the at least one WiFi access point in the list actively communicates in the current geographical location;
selecting a WiFi access point from the modified list; and
establishing a wireless session between the computer device and the selected WiFi access point.

30. The method as in claim 29, wherein establishing the wireless session includes attempting connectivity with each of multiple WiFi networks in the modified list based on a predetermined order of priority as specified by the list.

31. The method as in claim 26 further comprising:
establishing a wireless connection with one of the at least one active WiFi access point in the current geographical location in accordance with a predetermined order of priority as specified by the list.

32. The method as in claim 31, wherein the list includes favorite WiFi networks as pre-specified by an operator of the computer device prior to obtaining the location information, the method further comprising:
updating the list to include at least one active WiFi access point identified to be present in the geographical location, the computer device detecting presence of the at least one active WiFi access point based on the at least one active WiFi access point generating a response to a wireless discovery query generated by the computer device in the vicinity of the geographical location.

33. A computer system comprising:
a processor device; and
a hardware storage resource coupled to the processor device, the hardware storage resource storing instructions that, when executed by the processor device, cause the processor device to perform operations of:
obtaining location information, the location information indicating a geographical location in which a computer device resides;
mapping the location information to a list specifying at least one WiFi network resource registered as being present in a vicinity of the geographical location; and
establishing a wireless connection between the computer device and a WiFi network resource as specified in the list;
wherein the list includes an indication of multiple WiFi resources present in a vicinity of the geographical location as detected on a previous occasion prior to obtaining the location information; and
wherein establishing the wireless connection includes attempting connectivity with the multiple WiFi network resources in the list based on a predetermined order of priority as specified by a user of the computer device, the multiple WiFi network resources registered as being present in the geographical location prior to receiving a request by the user to establish the wireless connection, the predetermined order of priority specified by the user prior to obtaining the location information.

34. The computer system as in claim 33 further comprising:
receiving selection of an identifier value from the list, the selected identifier value indicating a particular WiFi network resource in a vicinity of the geographical location; and
establishing the wireless connection between the computer device and the particular WiFi network resource as specified in the list.

35. The computer system as in claim 33 further comprising:
monitoring a presence of wireless signals in the geographical location to identify at least one active WiFi network resource in the geographical location; and
selecting, from the identified at least one active WiFi network resource, a WiFi network resource that is highest priority in the list; and
establishing the wireless connection between the computer device and the selected WiFi network resource.

36. The computer system as in claim 33, wherein obtaining the current geographical information includes:

notifying a user of the computer device to manually input the location information indicating the geographical location; and receiving the geographical information based on the input from the user operating the computer device.

37. The computer system as in claim 33, wherein the list includes a favorite WiFi network as pre-specified by an operator of the computer device prior to obtaining the location information; and establishing the wireless connection between the computer device and the favorite WiFi network.

38. The computer system as in claim 33 further comprising:

retrieving network identifiers from the list;

initiating display of the network identifiers on a display screen of the computer device, each of the network identifiers specifying a corresponding WiFi network resource in the geographical location;

receiving selection of a particular WiFi network resource from the list based on input from an operator of the computer device; and establishing the wireless connection between the computer device and the particular WiFi network selected from the list.

39. The computer system as in claim 33 further comprising:

initiating display of a geographical map of the current geographical location on a display screen of the computer device, the geographical map including markers indicating locations of WiFi access points associated with each WiFi network as specified in the list.

40. A non-transitory computer-readable medium having instructions stored thereon, the instructions, when carried out by a processing device, causes the processing device to perform operations of:

obtaining location information, the location information indicating a geographical location in which a computer device resides;

utilizing the location information to produce a list specifying at least one WiFi network that is registered as being present in a vicinity of the geographical location; and establishing a wireless connection between the computer device and a WiFi network as specified in the list;

wherein establishing the wireless WiFi connection includes:

selecting a WiFi access point from the list; and transmitting a network address of the computer device to the selected WiFi access point, the selected WiFi access point acting as a proxy to the computer device as a basis to transmit and receive data on behalf of the computer device, the method further comprising:

executing a browser application on the computer device;

forwarding outbound data from the browser application on the computer device through the selected access point to target resources in a remote network; and receiving inbound data from the target resources through the selected access point, the inbound data directed to the browser application executing on the computer device.

41. A method to establish a WiFi connection comprising operations of:

in a computer device:

obtaining location information, the location information indicating a geographical location in which the computer device currently resides;

utilizing the location information to produce a list specifying at least one WiFi network present in a vicinity of the geographical location, the computer device originating the list based on map information stored in the computer device, the map information specifying the at least one WiFi network present in the vicinity of geographical location; and establishing a wireless WiFi connection between the computer device and a WiFi network as specified in the list;

wherein the geographical location is a first geographical location;

wherein the list is a first list, the method further comprising:

in the computer device:

detecting movement of the computer device from the first geographical location to a second geographical location;

producing a second list based on the map information stored in the computer device, the second list specifying WiFi access points available in the second geographical location; and establishing a wireless WiFi connection between the computer device and a WiFi access point as specified in the second list.

42. A method to establish a WiFi connection comprising operations of:

in a computer device:

obtaining location information, the location information indicating a geographical location in which the computer device currently resides;

utilizing the location information to produce a list specifying at least one WiFi network present in a vicinity of the geographical location, the computer device originating the list based on map information stored in the computer device, the map information specifying the at least one WiFi network present in the vicinity of the geographical location; and establishing a wireless WiFi connection between the computer device and a WiFi network as specified in the list;

wherein the geographical location is a first geographical location;

wherein the list is a first list, the first list specifying availability of at least a WiFi access point of a first service provider and a WiFi access point of a second service provider;

wherein the wireless WiFi connection is a first connection with the WiFi access point of the second service provider in the first list, the method further comprising:

detecting movement of the computer device from the first geographical location to a second geographical location;

receiving a second list, the second list specifying at least a WiFi access point of the second service provider and a WiFi access point of a third service provider; and initiating a hand off of the wireless WiFi connection from the WiFi access point of the second service provider in the first list to the WiFi access point of the second service provider in the second list.

43. The method as in claim 42 further comprising:

retrieving the map information, the map information including a mapping of different locations and corresponding network resources registered to be present in each of the different locations;

storing the map information in the computer device; and accessing the map information in the repository to produce the first list and the second list.

* * * * *